United States Patent [19]
Takeda et al.

[11] Patent Number: 5,687,152
[45] Date of Patent: Nov. 11, 1997

[54] OPTICAL PICKUP SYSTEM

[75] Inventors: Tadashi Takeda; Yoshio Hayashi, both of Nagano, Japan

[73] Assignee: Kabushiki Kaisha Sankyo Seiki Seisakusho, Nagano, Japan

[21] Appl. No.: 547,787

[22] Filed: Oct. 25, 1995

[30]       Foreign Application Priority Data

Oct. 25, 1994  [JP]  Japan .................................. 6-284129
Oct. 26, 1994  [JP]  Japan .................................. 6-286053

[51] Int. Cl.$^6$ ...................................................... G11B 7/12
[52] U.S. Cl. ........................ 369/103; 369/109; 369/112; 369/44.12
[58] Field of Search ............................ 369/103, 112, 369/110, 109, 44.14, 44.12, 44.37, 100, 111, 54, 58

[56]           References Cited

U.S. PATENT DOCUMENTS 5,049,732  9/1991  Nagahama et al. .................. 369/44.37
5,128,914  7/1992  Kurata et al. ........................ 369/44.37
5,446,719  8/1995  Yoshida et al. ...................... 369/116

*Primary Examiner*—Muhammad N. Edun
*Attorney, Agent, or Firm*—Sughrue, Mion, Zinn, Macpeak & Seas, PLLC

[57]               ABSTRACT

A tracking error signal and a focus error signal can be obtained with those components of the light (plus and minus first-order light) which have been diffracted by a hologram device whereas the undiffracted zero-order light component is for the sole purpose of producing RF signals. As a result, RF signals can be detected without using a segmented photodetector while insuring that output signals of a constant intensity are produced even if there are changes in the spot diameter and position. In addition, any aberrations that are caused by an half-mirror are corrected by optics that is provided in the optical path connecting the half-mirror and the light-receiving elements of a photodetector and this insures that even if an objective lens moves, detection spots on the individual light-receiving elements will move on the latter without causing any offset errors.

7 Claims, 6 Drawing Sheets

FIG. 4(a) DECREASE   FIG. 4(b) CORRECT   FIG. 4(c) INCREASE

OPTICAL PICKUP SYSTEM

FIELD OF THE INVENTION

The present invention relates to an optical pickup system for reading information from recording media such as optical disks and magnetooptical disks.

BACKGROUND OF THE INVENTION

Recording media such as CDs (compact disks) have the necessary information stored in the form of pit trains (tracks) on the disk surface and the recorded information is read by optical pickups. While various types of optical pickup have been proposed, the common system employs the three-spot method and the astigmatic method as shown in FIG. 16.

In the system, light from a laser 1 is passed through a diffraction grating 7 and a beam splitter 3 so that it is condensed by an objective lens 4. The condensed coherent light is focused on an information track (pit train) on a disk 5 and reflected back to pass through the objective lens 4 and beam splitter 3 to enter a photodetector 8. If the spot of a light beam interference by the illuminating light will reduce the quantity of reflected light compared to the case where reflection occurs in flat areas outside the pit. Hence, with optical pickups of the type shown in FIG. 16, the changes in the quantity of reflected light in accordance with the pit trains are converted to electric signals by means of photodetector 8 for producing an output.

It is practically impossible to expect that commercial optical disks will have the ideal flatness which is entirely free from surface warps and distortions and considering other phenomena such as disk wobbling, keeping the objective lens 4 in the pickup in proper position to the disk surface is most critical for the purpose of correct information reading. To this end, two kinds of control are performed, one being the position control in the tracking direction to ensure that the illuminating light from the source 1 such as a laser will not deviate from a particular pit train (track) and the other being the focus control to keep focusing the laser beam at a position coincident with the information surface of the disk. To accomplish these controls, the present position of the illuminating light must be detected and in the prior art the three-spot method is commonly used to detect tracking errors (TE) and the astigmatic method to detect focus errors (FE).

Figure 16:
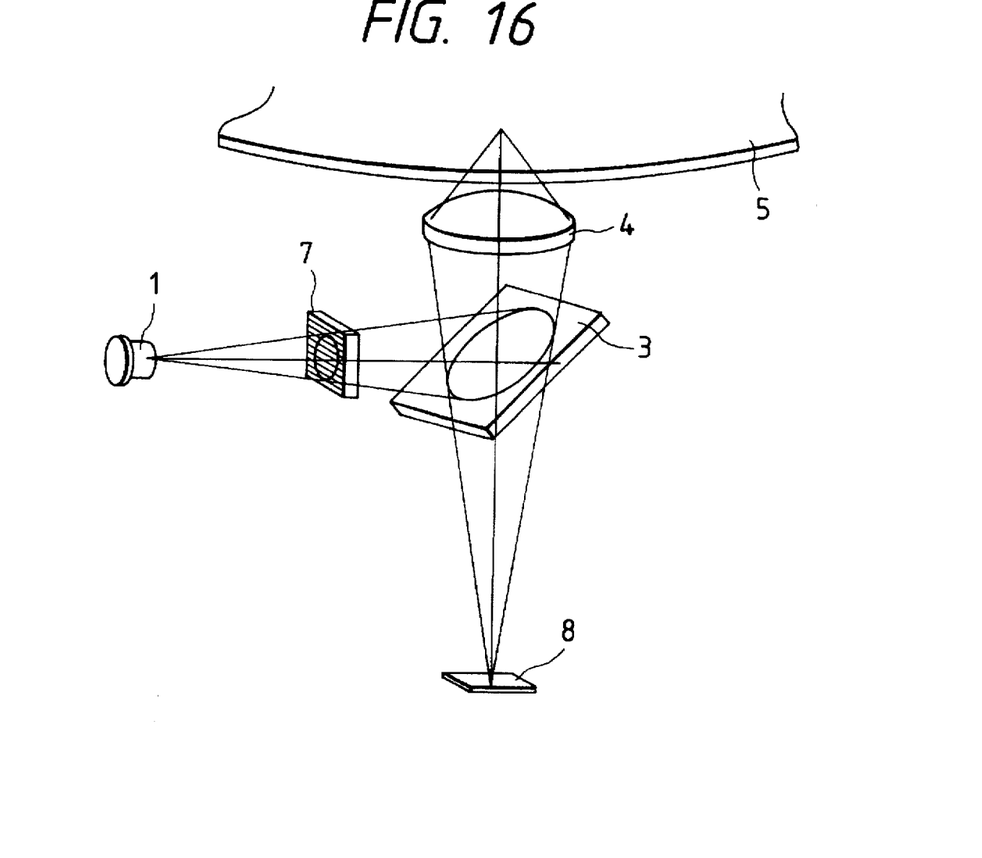
FIG. 16 shows schematically the basic construction of a prior art optical pickup system.
Figure 17:
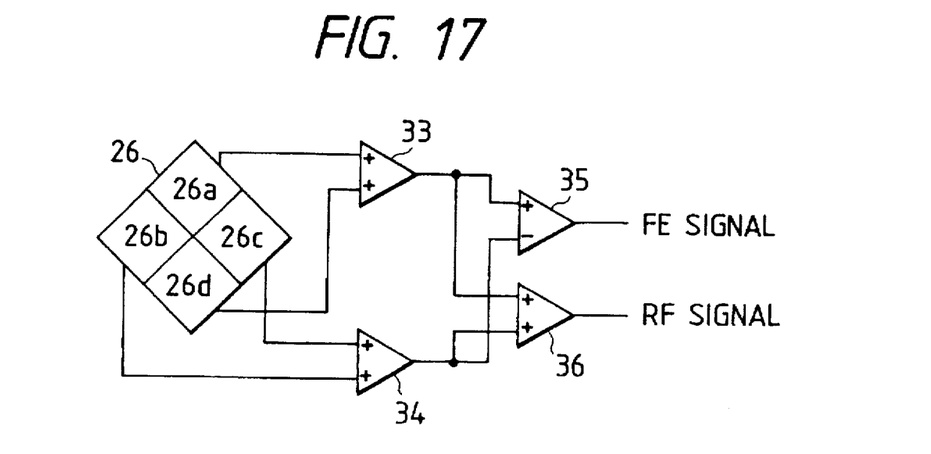
FIG. 17 illustrates a circuit wiring for the outputs of a prior art quadrant photodetector.

The principles of these prior art methods are illustrated in FIGS. 16 and 17. In the three-spot method, an incident laser beam is divided by the diffraction grating 7 into three beamlets, the zero-order, the plus first-order and the minus first-order beamlet, which are condensed such that three beam spots will align on the disk 5 slightly angled in the tracking direction of a recorded of a recorded information. By applying a servo such that the spots of the plus and minus components of the first-order diffracted light on both sides will produce signals of invariably equal intensity for reflected light, the position of the zero-order beam spot in the middle can be maintained at the center of the track. In the astigmatic method, the rays of reflected light from the surface of disk 5 are processed to create astigmatism and the resulting changes in beam spot (with respect to the direction of ellipse and the ellipticity) due to defocusing are detected by, for example, a quadrant photodector 26 that consist of two pairs of diagonal light-receiving elements (26a/26d and 26b/26c), the outputs of the two pairs are supplied to adders 33 and 34 which in turn output the results of addition to a comparator 35 that produces a FE signal as an output. And the outputs of the adders 33 and 34 are supplied to other adder 36 which outputs the result of as a RF signal.

When detecting focus errors by the astigmatic method, the conventional practice consists of providing a FE signal on the basis of the results of mathematical operations on the outputs of the quadrant photodetector 26 (see FIG. 17), so the centers of signal beam spots will lie on the dividing lines (dead zones) of the quadrant photodetector 26. Conventionally, a high-frequency (RF) signal which is the readout of the recorded data is provided from the total sum of the outputs from the respective light-receiving elements of the quadrant photodetector 26 (as obtained by adders 33, 34 and 36); however, as just mentioned above, the centers of beam spots having high optical power density are located in the dead zones, so the intensity of output signals will vary as a result of the changes in the spot diameter or position. Thus, the operation per se of the lens actuator for tracking and focus controls induces variations in output signals (so-called "jitter"), resulting in the deterioration of jitter characteristics.

SUMMARY OF THE INVENTION

It is therefore an object of the invention to provide an optical pickup system that is free from the adverse effect of the dead zones of a photodetector and which attains good jitter characteristics by ensuring against variations in the intensity of RF output signals in the presence of changes in the spot diameter or position and that also features higher reliability by insuring that no wrong operations will occur but consistent information reproduction can be performed even if the objective lens moves during tracking or focus controls.

According to a first aspect of the invention, there is provided an optical pickup system with which emerging light from a source illuminate a recording medium and reflected light from the recording medium is used to read the information of the recording medium comprising: a beam splitter; an objective lens; a photodetector; a hologram device for splitting the emerging light from the source into a plurality of beams, the hologram device being provided in the optical path between the source and the recording medium, and having a first dividing line generally orthogonal to the tracks on the recording medium and a pair of diffraction gratings that border on the first dividing line, the diffraction gratings having different conditions of diffraction from each other, at least one of the diffraction gratings having a capability for diffraction in the direction generally parallel to the tracks; and a photodetector having a plurality of light receiving elements, the light-receiving elements having second dividing lines, the second dividing lines being formed over the lines along which the positions of the centers of gravity of beam spots on the photodetector move when the objective lens moves in the tracking mode.

According to a second aspect of the invention, there is provide an optical pickup system with which emerging light from a source illuminate a recording medium and reflected light from the recording medium is used to read the information recorded in the track on the recording medium comprising: a beam splitter; an objective lens; a light-receiving element; a hologram device for splitting the emerging light from the source into a plurality of beams, the hologram device being provided in the optical path between the source and the recording medium, and having a first dividing line generally lying on the optical axis in the direction orthogonal to the tracks on the recording medium and a pair of diffraction gratings that border on the first dividing line, the diffraction gratings having different conditions of diffraction from each other, at least one of the diffraction gratings having a capability for diffraction in the direction generally parallel to the tracks; and an optics between the beam splitter and the light-receiving device for correcting the aberrations caused by the beam splitter.

DETAILED DESCRIPTION OF THE PREFERRED EMBODIMENTS

Embodiments of the present invention will now be described with reference to accompanying drawings.

1st Embodiment

Figures 1, 3:
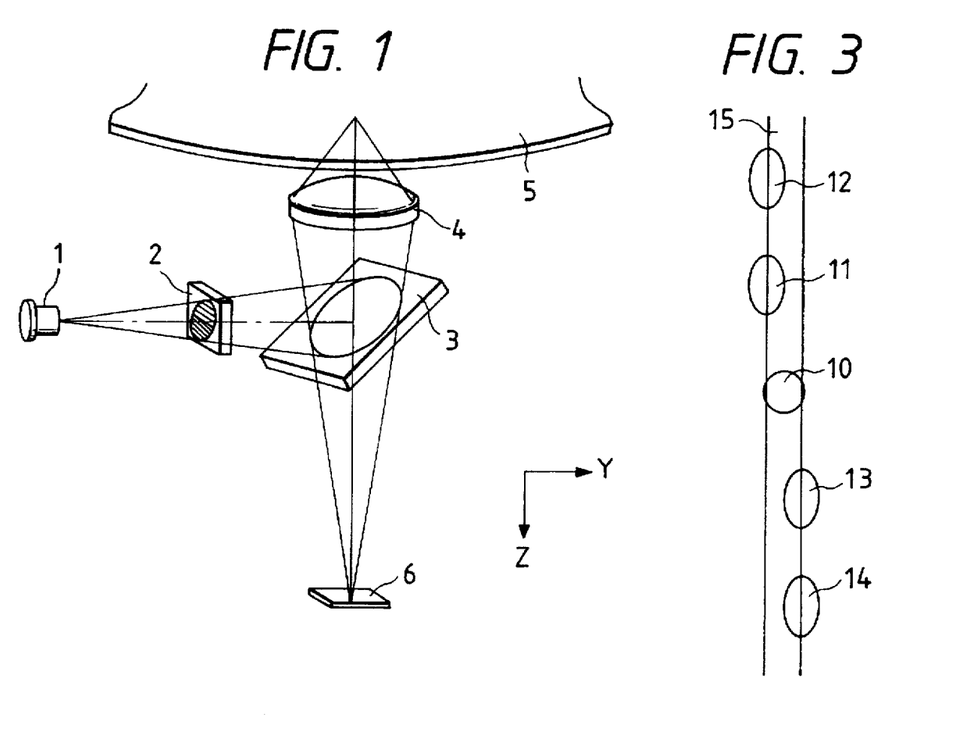
FIG. 1 shows schematically the basic construction of an optical pickup system according to a first embodiment of the invention.
FIG. 3 is a plan view illustrating how the surface of an optical disk is illuminated with five beam spots.

FIG. 1 shows schematically an optical pickup system according an first embodiment of the invention. In the optical pickup system shown, the light emerging from a semiconductor laser 1 as a source is split into a plurality of beams by means of a hologram device 2 and the resulting beams are reflected by a beam splitter 3 of a parallel-plate type and the reflected beams are passed through an objective lens 4 so that they are focused to form a plurality of beam spots on the recording surface of an optical disk 5. The reflected light from the optical disk 5 is passed again through the beam splitter 3 to 5 be directed to a photodetector 6.

Figure 2:
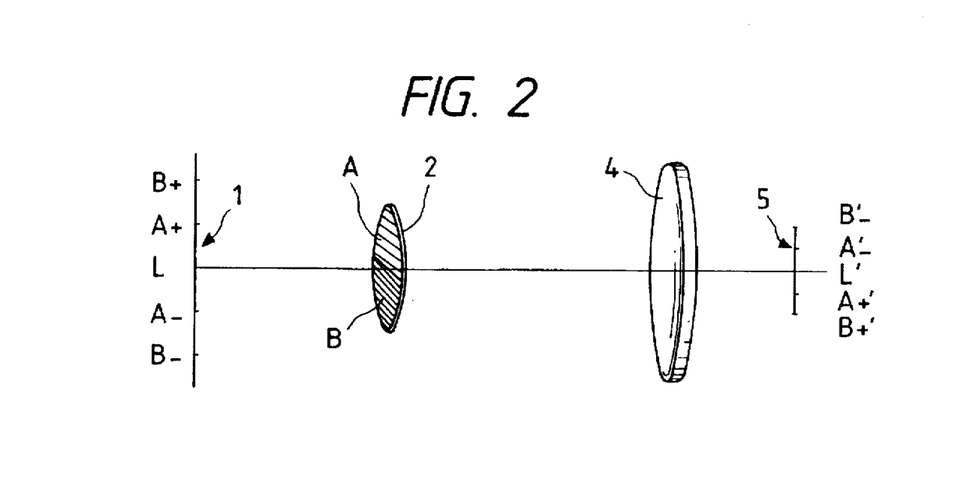
FIG. 2 shows the principle by which a hologram device allows a light beam to converge at a point on the recording surface of a disk.

As shown in FIGS. 1, 2 and 6, the hologram device 2 is divided by a line that generally lies on the optical axis in a direction orthogonal to the tracks 15 (see FIG. 3) on the medium 5. The dividing line extends in such a way that diffracted light $A_+$, $A_-$, $B_+$ or $B_-$ (see FIG. 2) will align along the track 15 (see FIG. 3) at angles equivalent to or greater than the track width. In addition, the hologram device 2 has a pair of diffraction gratings that border on the dividing line and that have different conditions of diffraction from each other, namely, two diffraction gratings A and B that have the line spacing and direction varied in such a way that the condition of diffraction on one side of the dividing line differs from that on the other side. At least one of these diffraction gratings A and B has a capability for diffraction toward tracks.

Figure 6A:
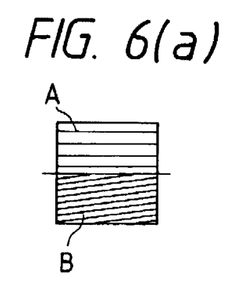
FIGS. 6(a)–6(e) show schematically various grating patterns that can be taken by a hologram device.
Figure 6B:
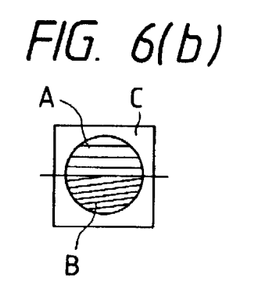
Figure 6C:
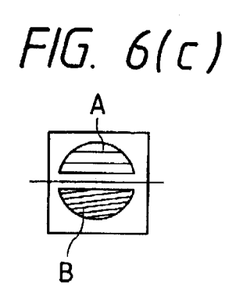
Figure 6D:
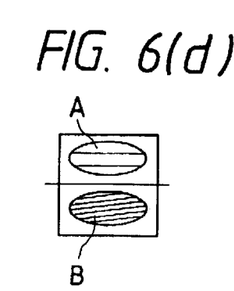
Figure 6E:
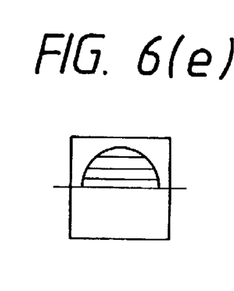

The hologram device used in the example under discussion is of the type shown in FIG. 6b but it should be noted that the effect to be described below will equally be attained by hologram devices of other types that are illustrated in FIGS. 6a, 6c, 6d and 6e.

The positions on the recording surface of the optical disk in which the undiffracted zero-order beam and the diffracted plus and minus first-order beams are focused by the action of hologram device 2 will now be discussed specifically with reference to FIG. 2 which illustrates the principle of the focusing operation. When a light beam issuing from the semiconductor laser 1 is launched into the upper diffraction grating A, the zero-order light passes undiffracted through the grating A to be launched into objective lens 4 so that it is focused at point L'. On the other hand, the plus and minus components of the diffracted first-order light will be launched into the objective lens 4 as if they issued from virtual images $A_+$ and $A_-$ which are symmetrical with respect to the optical axis with the position L of semiconductor laser 1 lying in the center and the incident beams will be focused at points $A_+'$ and $A_-'$. Thus, the respective component of the light beam issuing from the diffraction grating A are made convergent by the objective lens 4 to be focused at the corresponding positions (conjugated points) on the recording surface; namely, the zero-order component is focused at point L' which is conjugated to point L, whereas the plus and minus first-order components are focused at points $A_+'$ and $A_-'$ which are conjugated to points $A_+$ and $A_-$, respectively.

The same explanation will apply to the light beam that issues from the semiconductor laser 1 to be launched into the lower diffraction grating B. Thus, the zero-order component is focused at point L' which is conjugated to point L whereas the plus and minus first-order components are focused at points $B_+'$ and $B_-'$ which are conjugated to points $B_+$ and $B_-$, respectively. As a result, the light issuing from the semiconductor laser 1 is processed by the upper and lower diffraction gratings A and B in the hologram device 2 to create the undiffracted zero-order beam and the diffracted plus and minus first-order beams, which pass through the objective lens 4 so that they are focused to form spots on the recording surface of the optical disk 5 at five points, L', $A_+'$, $A_-'$, $B_+'$ and $B_-'$.

FIG. 3 shows how these spots look like when viewed in a direction normal to the recording surface of the optical disk 5. Spot 10 focused at the center of track 15 derives from the undiffracted zero-order light and the four other spots derive from the plus and minus components of the diffracted first-order light. Those light beams which have passed through the area of the hologram device 2 where no diffraction gratings are provided will be focused at the same spot as that derived from the undiffracted zero-order light. It should be noted that spots 11 and 13 derived from the plus and minus components of the diffracted first-order light through the upper diffraction grating A are symmetrical with respect to the central spot 10 and so are the spots 12 and 14 derived from the plus and minus components of the diffracted first-order light through the lower diffraction grating B. The plus and minus components of the diffracted first-order light that has passed through the diffraction gratings A and B can be focused at the appropriate positions on the track by specifying the line spacing and direction for each grating. The approximate shape of the spot derived from each of the plus and minus components of the diffracted first-order light is obtained as the Fourier transform of the numerical aperture of each grating.

Figure 4A:
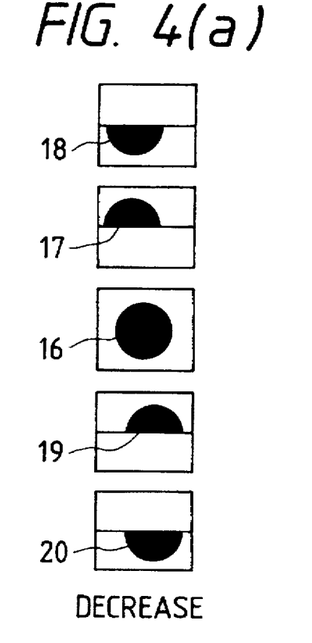
FIGS. 4(a)–4(c) illustrate how beam spots appear on the working surfaces of the light-receiving elements of a photodetector depending on the state of focus.
Figure 4B:
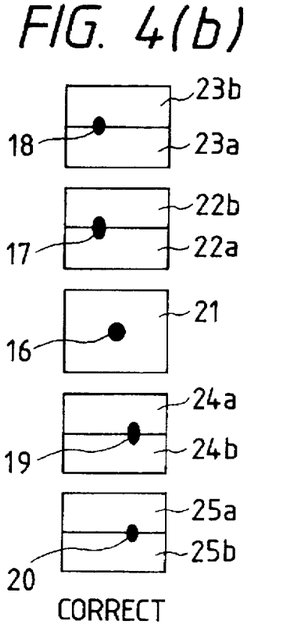
Figure 4C:
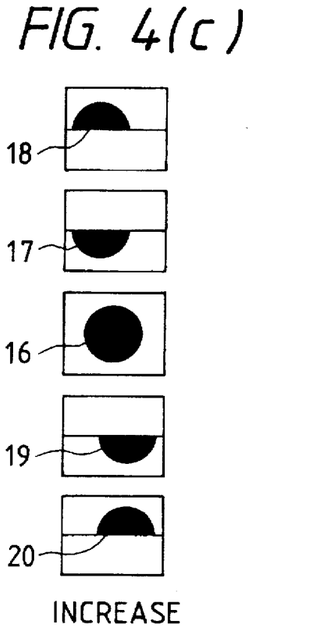

Discussion will now be made of beam spots to be formed on the photodetector 6. The five spots on the recording surface of the optical disk 5 are reflected back from the disk to pass through the objective lens 4 and beam splitter 3 again to be re-focused on the focal plane of the photodetector 6. The relative positions of the spots formed on the focal plane of the photodetector 6 satisfy conjugated relationships in the same as manner as discussed above for the five spots on the recording surface of the optical disk 5. Therefore, if the position of the objective lens 4 relative to the optical disk 5 is changed along the optical axis or in a direction normal thereto, the shape and position of each spot will change similarly on both the recording surface and the focal plane of the photodetector. The changes that occur to the beam spots on the photodetector 6 in response to defocusing, namely, the axial change in the position of the optical disk 5 as relative to the objective lens 4 will now be discussed with reference to FIG. 4.

At FIG. 4b, the focus is correct and spot 16 derived from the zero-order beam is at the center; positioned on opposite sides of spot 16 are an upper spot 17 and a lower spot 19 which are derived from the plus and minus beams of the diffracted first-order light through the diffraction grating A, and positioned further upward and downward are spots 18 and 20, respectively, which are derived from the plus and minus beams of the diffracted first-order light through the diffraction grating B. All of those spots have a minimum diameter. It should also be noted here that spot 16 is located at the center of light-receiving element 21 whereas spots 17–20 derived from the diffracted plus and negative first-order beams have their centers located on the dividing lines of bisected light-receiving elements 22a/22b, 23a/23b, 24a/24b and 25a/25b which are aligned on opposite sides of the light-receiving element 21.

At FIG. 4a, the distance between objective lens 4 and optical disk 5 decreases and the spot 16 derived from the zero-order beam remains at the same position but increases in diameter whereas the spots 17 and 19 derived from the diffracted plus and minus first-order beams through the diffraction grating A increase in size to become similar to the shape of the aperture in the grating A as their center moves upward in FIG. 4, and spots 18 and 20 derived from the diffracted plus and minus first-order beams through the diffraction grating B also increase in size to become similar to the shape of the aperture in the grating B as their center moves downward in FIG. 4. As a result, spots 17–20 derived from the diffracted plus and minus first-order beams will deviate from the dividing lines of bisected light-receiving elements 22a/22b–25a/25b such that the greater part of each spot is located on one side of the dividing line. It should be noted that FIG. 4 shows the ideal state in which the spots 17–20 are located on only one side of the dividing lines but in practice those spots will partly lie on the other side because of blurs and other reasons.

At FIG. 4c, the distance between objective lens 4 and optical disk 5 increases and the spot 16 derived from the zero-order beam also remains at the same position but increases in diameter whereas the spots 17 and 19 derived from the diffracted plus and minus first-order beams through the diffraction grating A increase in size to become similar to the inverted shape of the aperture in the grating A as their center moves downward in FIG. 4, and spots 18 and 20 derived from the diffracted plus and minus first-order beams through the diffraction grating B also increase in size to become similar to the inverted shape of the aperture in the grating B as their center moves upward in FIG. 4.

Figure 5:
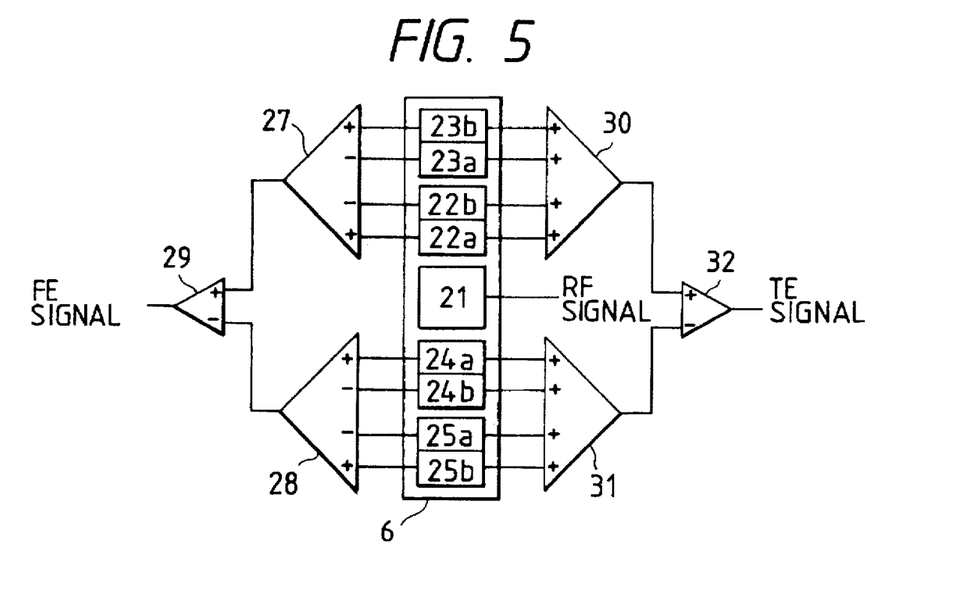
FIG. 5 shows a circuit wiring for producing a RF signal, a FE signal and a TE signal from the outputs of individual elements of the photodetector.

Therefore, FE and TE signals can be obtained by processing the outputs of light-receiving elements 21, 22a/22b–25a/25b in the photodetector 6 through a circuit configuration as shown in FIG. 5. Stated more specifically, FE signals are obtained by comparing the outputs of 22a/22b and 23a/23b in a comparator 27 and the outputs of 24a/24b and 25a/25b in a comparator 28 (note the polarities of the inverting and non-inverting inputs of each comparator) and then feeding the results of comparisons to a comparator 29. Providing FE signals in this way offers the advantage that even if the wavelength of the light source varies during the comparison to cause changes in the angles of diffraction of the plus and minus first-order light beams, the resulting variations in the outputs of the associated bisected light-receiving elements can be effectively cancelled out.

To detect tracking errors in the position of the optical disk 5 relative to the objective lens 4, the conventional three-spot method can be applied without any modification. As shown in FIG. 5, TE signals can be obtained by adding the outputs of 22a/22b and 23a/23b in an adder 30 and the outputs of 24a/24b and 25a/25b in an adder 31 and then feeding the results of additions to a comparator 32.

It should be noted that TE signals can also be obtained by processing either the combination of the outputs from 22a/22b and 24a/24b or the combination of the outputs from 23a/23b and 25a/25b.

As for RF signals, the diameter of the spot derived from the undiffracted zero-order beam changes with the degree of focusing but the spot is always located on the light-receiving element 21 in the photodetector 6. Therefore, the dead zones of the photodetector will not cause any adverse effects at all although this has been a serious problem in the prior art.

Figure 7:
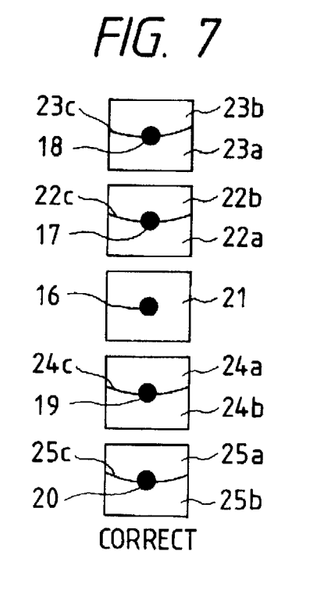
FIG. 7 illustrates how beam spots appear on the working surfaces of the light-receiving elements of the photodetector when the focus is correct.
Figure 8:
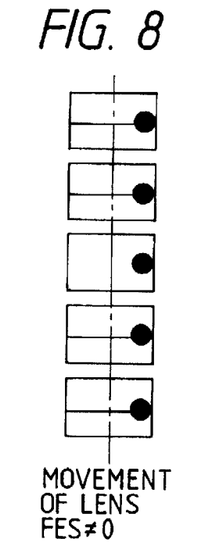
FIG. 8 illustrates how beam spots appear on the surfaces of the light-receiving elements of the photodetector when they are divided by straight lines extending generally orthogonal to the tracks.
Figure 9:
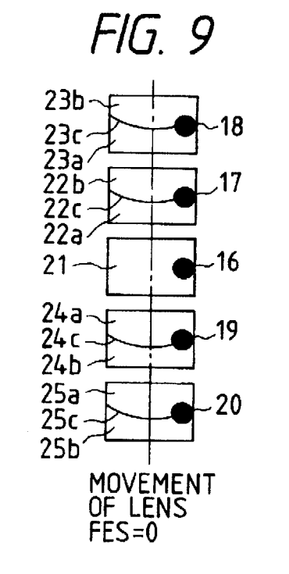
FIG. 9 illustrates how beam spots appear on the surfaces of the light-receiving elements of the photodetector when they are divided by lines that are formed over the line along which the positions of the centers of gravity of beam spots on the photodetector move when an objective lens moves in a tracking mode.

Turning now back to the beam splitter 3, it is of a parallel-plate type as already mentioned above, so aberrations such as astigmatism will develop when convergent light passes through it. Stated more specifically, when the objective lens 4 moves to follow a track of interest for tracking or focus control, the astigmatism caused by the beam splitter 3 will affect detection spots 17–20 on the light-receiving elements in the photodetector 6 in such a way that the positions of their centers (the centers of gravity) will move along curves 22c–25c as shown in FIGS. 7 and 9. This is more clearly shown in FIG. 8 and the centers of those detection spots will move either to right or left as they are displaced either upward or downward with respect to the center lines (imaginary dividing lines) through the respective light-receiving elements.

If this occurs, the outputs of the bisected light-receiving elements will become unbalanced to cause various problems, among which the occurrence of an offset in the focusing error detection signal (FES≠0) is worth particular mention since it introduces an operational error into focus control.

According to the first embodiment, dividing lines 22c–25c of the photodetector are formed over the line along which the positions of the centers of gravity of beam spots 17–20 on the photodetector move when the objective lens 4 moves in a tracking mode (see FIGS. 7 and 9). Because of this design, the outputs of the bisected light-receiving elements will not become unbalanced and, in particular, no offset develops in the focusing error detection signal (FES= 0), enabling satisfactory performance of the intended focus control.

This offers the added advantage that if the objective lens 4 moves to follow a track of interest for the purpose of tracking or focus control, the individual detection spots 17–20 will not change in shape but will move over the dividing lines 22c–25c of the light-receiving elements as shown in FIG. 9.

As described on the foregoing pages, the optical pickup system of the embodiment under consideration has hologram device 2 provided in the optical between the semiconductor laser 1 and the optical disk 5 for splitting the emerging light from the laser 1 into a plurality of beams, and this hologram device has a pair of diffraction gratings A and B that border on a dividing line generally orthogonal to a track 15 on the optical disk 5 and that have different conditions of diffraction from each other, at least one of the gratings A and B having a capability for diffraction in a direction generally parallel to the tracks. With the pickup system of this design, tracking error signals as well as focus error signals are obtained from those components of the light (plus and minus first-order light) that have been diffracted with the hologram device 2 whereas the undiffracted zero-order light component is used for the sole purpose of producing RF signals. Therefore, there is no need to use a divided photosensor to detect RF signals and this helps totally eliminate the adverse effect of the dead zones of the light-receiving elements, so even if there are changes in the spot diameter and position, the intensity of optical information signals will in no way change, thereby enabling the detection of signals having improved jitter characteristics. As for FE signals, the system is protected against any adverse effects such as wavelength variations and wobbling of the recording media such as optical disks.

If the objective lens 4 moves during tracking or focus control, the astigmatism caused by the beam splitter 3 will work adversely such that the centers of gravity of beam spots on the photodetector 6 will deviate from the (straight) dividing lines, causing the offset of the focus servo to depart from a preset value during signal reproduction and this can potentially lead to an erroneous operation. In the invention, however, the dividing lines 22c–25c of the photodetector 6 are formed over the line along which the positions of the centers of gravity of beam spots 17–20 on the photodetector 6 move when the objective lens 4 moves in the tracking mode. Because of this arrangement, the beam spots 17–20 on the photodetector will move over the dividing lines 22c–25c of that photodetector even if the objective lens 4 moves during tracking or focus control and, as a result, the photodetector will produce consistent detection signals that are free from the offset and other problems, whereby the overall reliability of the pickup system can be improved.

2nd Embodiment

Figure 13:
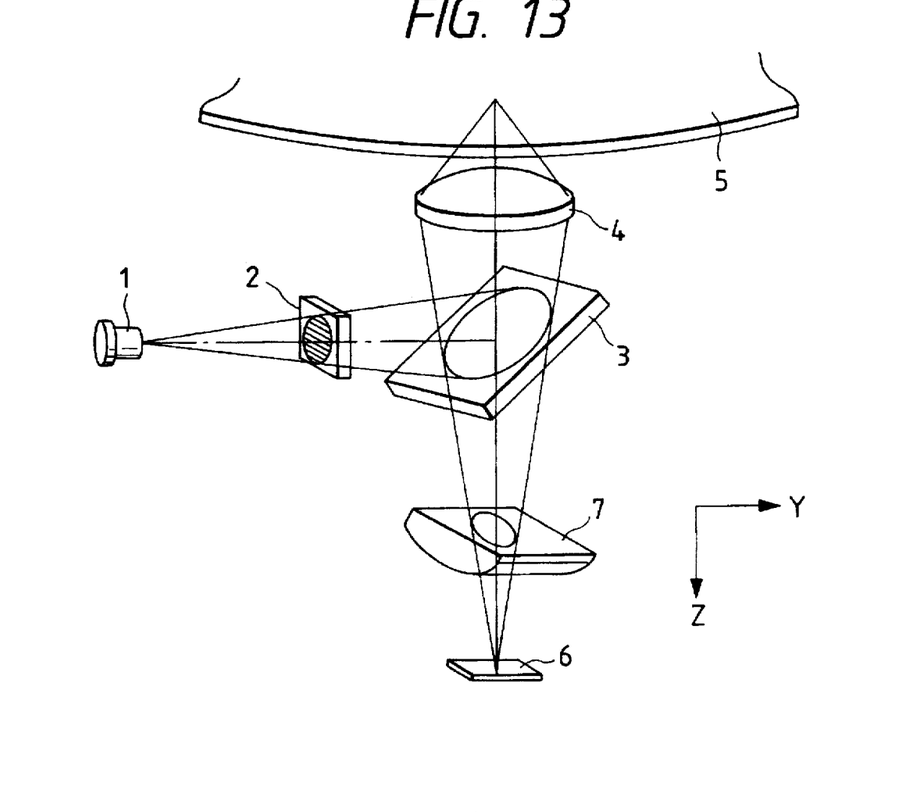
FIG. 13 shows schematically the basic construction of an optical pickup system according to a second embodiment of the invention.

FIG. 13 shows schematically the construction of an optical pickup system according to a second embodiment of the present invention. FIG. 13 is essentially the same as FIG. 1 showing the first embodiment of the invention, except that a cylindrical lens 7 is provided between the beam splitter 3 and the photodetector 6. Therefore, the following description of the second embodiment of the invention uses like numerals to identify those parts which are common to the first embodiment and the second embodiment of the invention. Those parts which were already described in connection with the first embodiment of the invention will not be discussed in the following description.

As in the first embodiment, the second embodiment of the invention uses beam splitter 3 of a parallel-plate type. The characteristic portion of the second embodiment is that cylindrical lens 7 is provided between the beam splitter 3 and the photodetector 6. The cylindrical lens 7 is provided in the optical path between the beam splitter 3 and the photodetector 6 to provide optics for correcting the aberrations that will be caused by the beam splitter 3. Therefore, the light beam passing through the beam splitter 3 will progressively change in cross-sectional shape as shown in FIGS. 12a–12e as it departs farther away from the beam splitter 3.

If, in the absence of cylindrical lens 7, the objective lens 4 moves in a direction orthogonal to the tracks during tracking or focus control, the aberration caused by the beam splitter 3 will make the detection spot move on the light-receiving device 6 as its center (of gravity) is displaced from the center line through the light-receiving device. To avoid this problem, the cylindrical lens 7 is composed of a convex or concave lens that has a refractive power in the direction of Y which is orthogonal to the tracks.

Figure 10A:
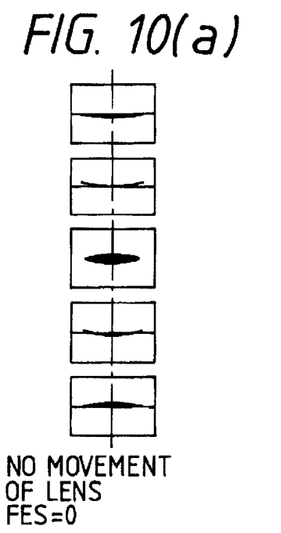
FIGS. 10(a) and 10(b) illustrate how beam spots appear on the surfaces of the light-receiving elements in the absence of optics for correcting the aberrations caused by the beam splitter.
Figure 10B:
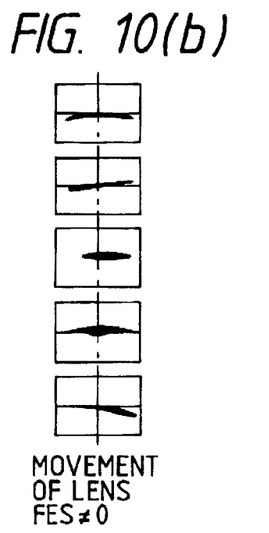

FIG. 10 shows how the spot on the light-receiving device will look like before and after the objective lens 4 moves in the absence of the cylindrical lens 7. As FIG. 10a shows, detection spots are located at the centers of respective light-receiving elements of the photodetector if there is no movement of the objective lens 4. If the objective lens 4 moves in the direction of Y (orthogonal to the tracks) for tracking or focus control, the detection spots will change in shape while deviating from the center lines (dividing lines) of the light-receiving elements as shown in FIG. 10b. If this occurs, the output of each bisected light-receiving element will become unbalanced and, in particular, an offset develops in the focus error detection signal (FES≠0), leading to an erroneous operation of focus control.

Figure 11A:
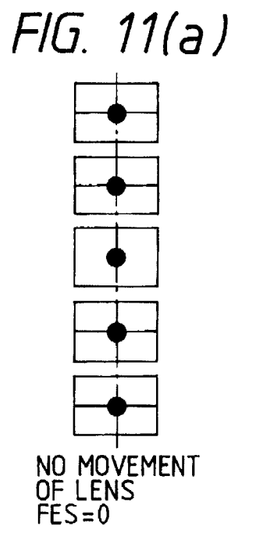
FIGS. 11(a) and 11(b) illustrate how beam spots appear on the surfaces of the light-receiving elements in the presence of optics for correcting the aberrations caused by the beam splitter.
Figure 11B:
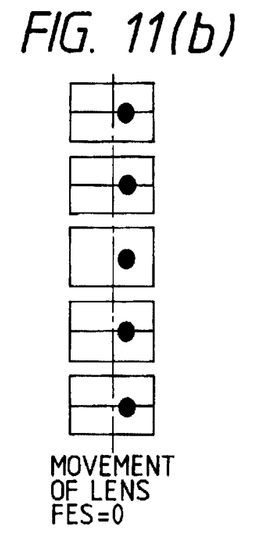
Figure 12A:
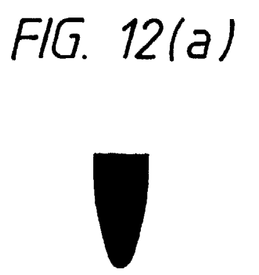
FIGS. 12(a)–(e) illustrate how the light beam passing through the beam splitter changes in cross-sectional shape.
Figure 12B:
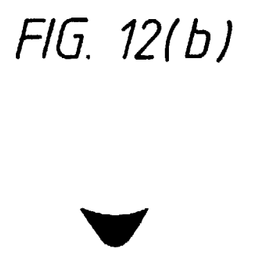
Figure 12C:
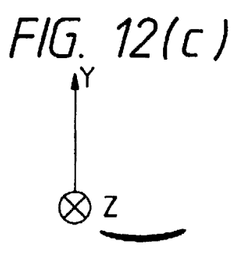
Figure 12D:
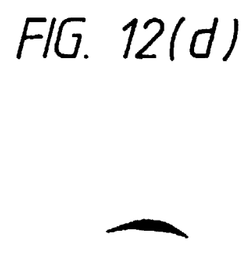
Figure 12E:
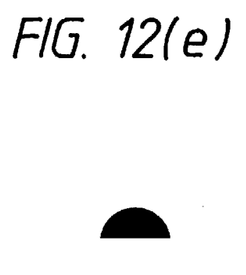

However, if the cylindrical lens 7 for correcting the aberrations caused by the beam splitter 3 is provided as in the second embodiment of the invention, the detection spots 17–20 are generally circular and illuminate the centers of the respective light-receiving elements as shown in FIG. 11a if there is no movement of the objective lens 4. If the objective lens 4 moves in the direction of Y (orthogonal to the tracks) for tracking or focus control, the detection spots will not change in shape but move along the center lines (dividing lines) of the respective light-receiving elements as shown in FIG. 11b. In this case, the outputs from the bisected light-receiving elements will not become unbalanced and, in particular, no offset will develop in the focus error detection signal (FES=0), permitting the intended focus control to be performed satisfactorily.

Thus, the second embodiment of the invention uses the cylindrical lens 7 which is positioned between the beam splitter 3 and the light-receiving device 6 as optics for correcting the aberrations that are caused by the beam splitter 3 and this arrangement ensures that even if the objective lens 4 moves to effect tracking or focus control, the detection spot will move on the light-receiving device 6 without being affected by the aberrations caused by the beam splitter 3 and detection signals free from the offset and other problems will be produced from the light-receiving device 6.

3rd Embodiment

Figure 14:
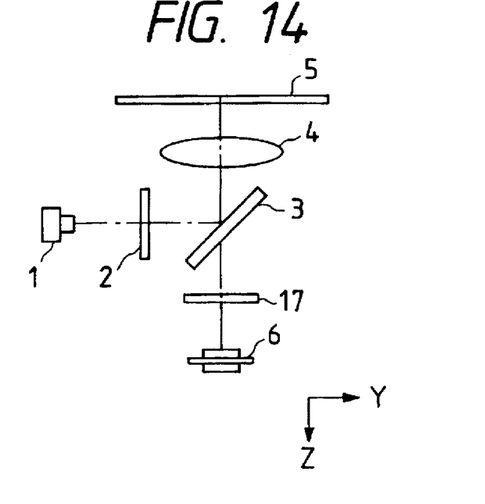
FIG. 14 shows schematically the basic construction of an optical pickup system according to a third embodiment of the invention.

FIG. 14 shows a third embodiment of the invention. As shown, a diffracting lens 17 is provided as the optics for correcting the aberrations caused by the beam splitter 3. This diffracting lens 17 is so adapted that it exhibits a great capability for diffraction in the direction of Y which is orthogonal to the tracks. The simplest form of this lens could be a linear diffraction grating having its lines extend along the tracks in a direction normal to Y.

4th Embodiment

Figure 15:
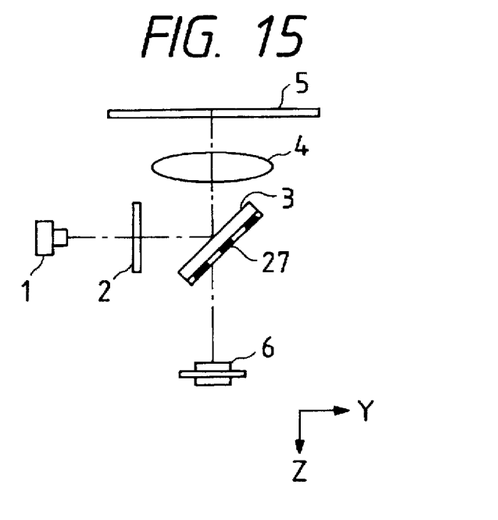
FIG. 15 shows schematically the basic construction of an optical pickup system according to a fourth embodiment of the invention.

FIG. 15 shows a fourth embodiment of the invention. As shown, a diffracting lens 27 for correcting the aberrations caused by the beam splitter 3 is provided as an integral part of the entrance surface of the beam splitter 3.

While the aforementioned embodiments of the present invention have been described above with particular reference to a pickup for use with optical disks but they are equally applicable to magnetooptical disks if a polarizing separation device is provided between the beam splitter 3 and the photodetector 6 which are shown in FIG. 1.

As described on the foregoing pages, the optical pickup systems according to the present invention are entirely free from the adverse effect of the dead zones of the photosensing elements, so even if there are changes in the spot diameter and position, the intensity of RF output signals will in no way change, thereby enabling the detection of signals having improved jitter characteristics.

If the objective lens moves during tracking or focus control, the astigmatism caused by the beam splitter will work adversely such that the centers of gravity of beam spots on the photodetector will deviate from the (straight) dividing lines, causing the offset of the focus servo to depart from a preset value during signal reproduction and this can potentially lead to an erroneous operation. In the first embodiment of the invention, however, the dividing lines of the photodetector are formed over the line along which the positions of the centers of gravity of beam spots on the photodetector move when the objective lens moves in the tracking mode. Because of this arrangement, the beam spots on the photodetector will move over the dividing lines of that photodetector even if the objective lens moves during tracking or focus control and, as a result, the photodetector will produce consistent detection signals that are free from the offset and other problems, whereby the overall reliability of the pickup system can be improved.

According to the second, third and fourth embodiments of the invention, optics for correcting the aberrations that are caused by the beam splitter is positioned between the beam splitter and the light-receiving device and this arrangement ensures that even if the objective lens moves to effect tracking or focus control, the detection spot will move on the light-receiving device without being affected by the aberrations caused by the beam splitter and detection signals free from the offset and other problems will be produced from the light-receiving device. This insures consistent signal reproduction without erroneous operations due to lens movement and, as a result, the overall reliability of the pickup system is improved.

What is claimed is:

1. An optical pickup system with which emerging light from a source illuminate a recording medium and reflected light from the recording medium is used to read the information of the recording medium comprising:

a beam splitter reflecting the emerging light from the source toward the recording medium and passing the reflected light from the recording medium;

an objective lens disposed between said beam splitter and the recording medium;

a photodetector receiving the reflected light passing through said said beam splitter;

a hologram device for splitting the emerging light from the source into a plurality of beams, said hologram device being provided in the optical path between the source and said beam splitter, and having a first dividing line generally orthogonal to the tracks on the recording medium and a pair of diffraction gratings that border on said first dividing line, said diffraction gratings having different conditions of diffraction from each other, at least one of said diffraction gratings having a capability for diffraction in the direction generally parallel to the tracks; and a photodetector having a plurality of light receiving elements, said light-receiving elements having second dividing lines, said second dividing lines being formed over the lines along which the positions of the centers of gravity of beam spots on said photodetector move when said objective lens moves in the tracking mode.

2. An optical pickup system according to claim 1, wherein said beam splitter is of a parallel-plate type.

3. An optical pickup system with which emerging light from a source illuminate a recording medium and reflected light from the recording medium is used to read the information recorded in the track on the recording medium comprising:

a beam splitter reflecting the emerging light from the source toward the recording medium and passing the reflected light from the recording medium;

an objective lens disposed between said beam splitter and the recording medium;

a light-receiving element receiving the reflected light passing through said said beam splitter;

a hologram device for splitting the emerging light from the source into a plurality of beams, said hologram device being provided in the optical path between the source and said beam splitter, and having a dividing line generally lying on the optical axis in the direction orthogonal to the tracks on the recording medium and a pair of diffraction gratings that border on said dividing line, said diffraction gratings having different conditions of diffraction from each other, at least one of said diffraction gratings having a capability for diffraction in the direction generally parallel to the tracks; and an optics between said beam splitter and said light-receiving device for correcting the aberrations caused by said beam splitter.

4. An optical pickup system according to claim 3, wherein said beam splitter is of a parallel-plate type.

5. An optical pickup system according to claim 3, wherein said optics for correcting the aberrations caused by said beam splitter is composed of a cylindrical lens.

6. An optical pickup system according to claim 3, wherein said optics for correcting the aberrations caused by said beam splitter is composed of a diffracting lens.

7. An optical pickup system according to claim 6, wherein said diffracting lens is provided as an integral part of said beam splitter.

* * * * *